July 22, 1924.
W. W. ROBINSON
PRESSURE REDUCING VALVE
Filed July 18, 1921
1,502,212
2 Sheets-Sheet 1
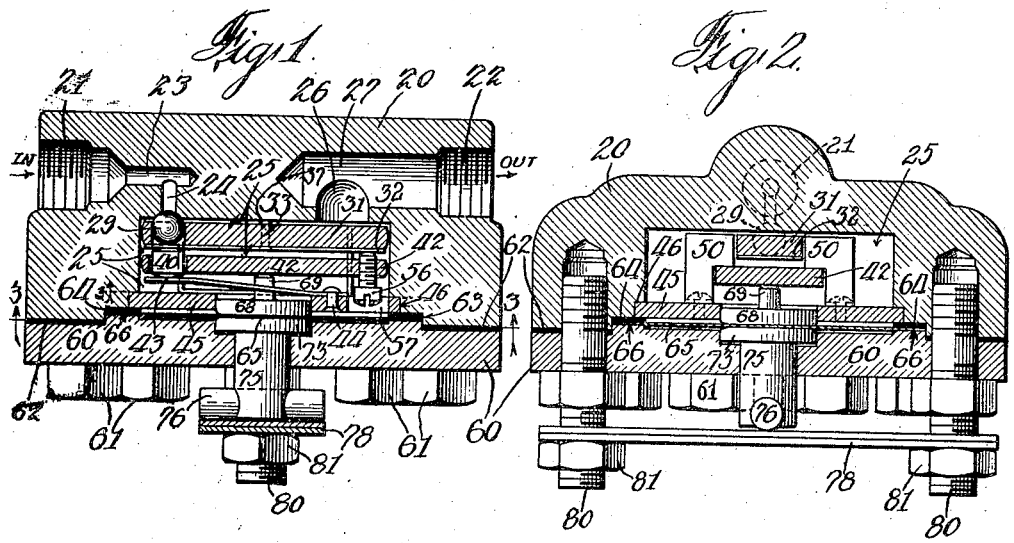
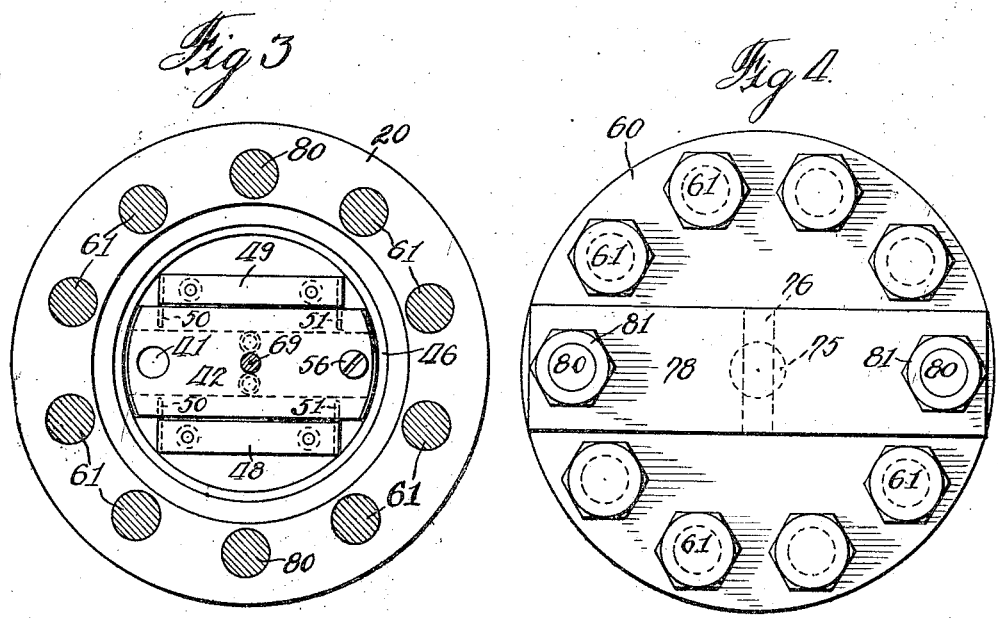
Witness:
Dart S. Magnusson.
Inventor:
Walter W. Robinson
By Luther Johns
Atty.

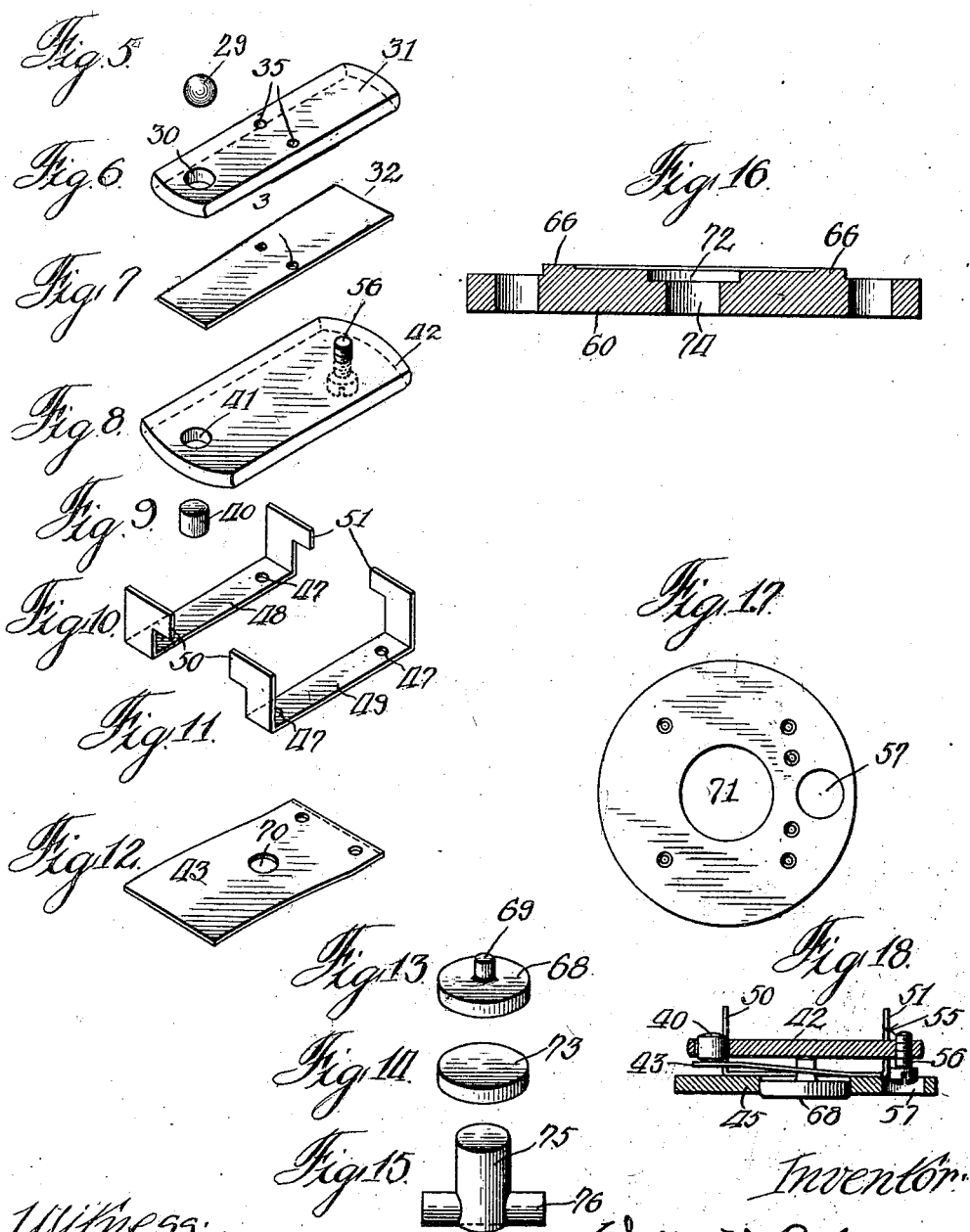

Patented July 22, 1924.

1,502,212

UNITED STATES PATENT OFFICE.

WALTER W. ROBINSON, OF BELOIT, WISCONSIN, ASSIGNOR OF ONE-HALF TO BENJAMIN F. LYONS, OF BELOIT, WISCONSIN.

PRESSURE-REDUCING VALVE.

Application filed July 18, 1921. Serial No. 485,783.

*To all whom it may concern:*

Be it known that I, WALTER W. ROBINSON, a citizen of the United States, residing at Beloit, Rock County, Wisconsin, have invented certain new and useful Improvements in Pressure-Reducing Valves, of which the following is a specification.

These improvements relate to automatic valve means adapted to be positioned in fluid pressure pipe line for providing a high pressure side and a low pressure side therein. Such devices have various practical applications, for instance in refrigerating systems.

The principal object of the present improvements is to provide an efficient pressure-reducing valve according to simple, relatively cheap, strong and durable construction. A specific object is to avoid a plurality of joints to be packed against leakage, and to provide a construction in which there is but one such joint, and importantly, a single joint which is on the low pressure side of the valve. Another specific object is to provide a construction according to which the desired adjustments for regulating the action of the device under different conditions may be easily and readily accomplished.

In the accompanying drawings, which form a part of this specification, Figure 1 is a medial vertical section through the device complete; Fig. 2 is a similar section at right angles to that of Fig. 1; Fig. 3 is a horizontal section on the broken line 3—3 of Fig. 1 in the direction of the arrows; Fig. 4 is a bottom plan of the device; and Figs. 5 to 18 inclusive are details of the construction, Fig. 16 being in sectional view as in Fig. 2, and Fig. 18 showing partly in section an assembly of several of the parts.

The structure thus illustrated includes a casing consisting of two principal parts, the main body part 20 being shown as a circular integral, unitary metallic block, bored and tapped at 21 to receive a pipe for conducting high fluid pressure to the valve and being also bored and tapped at 22 for holding a pipe for carrying low pressure from the device. A reduced boring at 23, and one at 24 at right angles thereto is made constituting part of the high pressure passageway or intake part, and the passageway 24 opens into an interior cylindrical chamber 25 formed as a recess in one side of the block 20 and accommodating various operative parts. From this chamber 25 a passageway 26 is made opening into the extension 27 of the low-pressure pipe connection or outlet part at 22. There is thus a passageway through the device, which passageway is at all places within the integral block or metallic body 20 of the device.

Where the relatively small passageway 24 enters the chamber 25 the opening is recessed to accommodate the steel ball 29 with a tight fit, thus forming a ball-valve construction at this place. The ball 29 is loosely held in a hole 30 in a metallic plate 31 which has riveted to it a ball-retaining plate 32, the rivets 33 (Fig. 1) extending through the holes 34 and 35 (Figs. 7 and 6) and being headed at 37 (Fig. 1) to form a fulcrum for the laminated plate or lever 31—32 whereby this lever may rock. The retaining plate 32 holds the ball 29 in its operative position, and the plate 31—32 is formed in two parts merely for convenience in manufacture.

The ball 29 is forced against its valve seat by a cylindrical plunger 40 (Figs. 1 and 9) loosely fitting in the hole 41 of the plate or lever 42. A leaf spring 43 (Figs. 1 and 12) presses against the plunger 40, this pressure being communicated through the plate 32 to the ball 29. The spring 43 is held by a pair of rivets 44 (one thereof being shown in full lines in Fig. 1) to a circular plate 45 (Figs. 1 and 17), which plate 45 is held in an annular recess at 46 in the body 20.

The circular plate 45 carries a pair of frames 48 and 49 (Figs. 10 and 11) secured thereto in spaced-apart relation by riveting through the holes 47, the frames 48 and 49 having projections 50 directed toward each other at one end and similar projections 51 at the other end, these projections being adapted to overlie the plate 42. The plate or lever 31—32 fits loosely between the projections (Fig. 2) which act as guides for the member.

From Fig. 18 it will clearly appear that the distance from the plate 45 to the under surface of a projection 50 is less than the distance from the plate 45 to the under surface of a projection 51. The plate 42 rests against the projections 50 at one end portion as a fulcrum, there being space at 55 for upward movement of the plate 42 at its other end portion. The adjusting screw 56 carried by the plate 42 and easily reached through the hole 57 (Figs. 1 and 17) bears against the lever 31—32, and thus when the right hand end of the lever 42, as illustrated, moves upward the right hand end of the lever 31—32 is similarly moved upward, this lever 31—32 being rocked on the fulcrum 37, the left hand end of the lever 31—32 being lowered, forcing the spring 43 downward, relieving the pressure against the ball 29 and opening the valve there, the levers 31 and 41 forming a system of levers providing a compound movement by which the movement of the valve 29 is increased or decreased a relatively great amount when the diaphragm is moved a relatively small amount.

Another part of the casing is the circular plate 60 which is formed to fit upon the main body part 20, and is held thereon by a plurality of bolts 61, the two parts of the casing 20 and 60 being surfaced at 62 and a packing gasket being interposed between the two casing parts there. This joint at 62 is the only one required to be packed against leakage, and since this joint is on the low-pressure side of the device the danger of leakage there is reduced to the minimum.

The main casing 20 is annularly recessed at 63 to accommodate a gasket washer 64 against which lies a metallic diaphragm 65, the casing plate 60 having an annular and surfaced projection at 66 adapted to hold the diaphragm 65 tightly against the washer 64, the diaphragm being spaced from the plate 45 and from the casing plate 60, as well illustrated in Figs. 1 and 2. This diaphragm covers and closes the recess or chamber 25. Loosely resting on the diaphragm 65 and fitting loosely in the hole 71 (Fig. 17) of the plate 45 is a disc-like button 68 having a central stud 69 projecting through the hole 70 (Fig. 12) of the spring 43 and into contact with the lever 42.

The casing plate or cover 60 (Fig. 16) is recessed at 72 to accommodate loosely the disc 73 (Fig. 14), and the plate is further bored at 74 to accommodate loosely the cylindrical stem 75 (Fig. 15) having a cross piece 76 in the form of a cylindrical rod extending slightly beyond the outer end of the cylinder 75, as well to be seen from Fig. 2. A leaf spring 78 (shown in double form) is held at its ends by a pair of stud bolts 80 threaded into the body 20, and the pressure of the spring 78 is adjustable by means of nuts 81.

With this understanding of the construction the operation may be pointed out as follows: Consider the available high pressure, for instance one hundred and fifty pounds per square inch to be conducted to the valve by a pipe threaded into the main casing at 21, and suppose also that it be desired to deliver a low pressure of say twenty pounds per square inch to the pipe leading from the device at 22. The high-pressure passageway 24 being quite small, say for instance three thirty-seconds of an inch or less in diameter, a comparatively low pressure by the leaf spring 43 will maintain the ball 29 against its seat and prevent the high pressure from entering the main chamber 25. The pressure of the external leaf spring 78 is so adjusted that the desired fluid pressure within the valve of say twenty pounds per square inch is just sufficient to flex the diaphragm 65 slightly in the outward direction against the force of the spring 78. The adjusting screw 56 contacts the composite plate 31—32 when the diaphragm is thus outwardly bowed. As soon as the low pressure falls below the desired amount of say twenty pounds per square inch the external spring 78 forces the diaphragm 65 in the inward direction, this motion being communicated through the stud 69 to the lever 42, which lever is free to move only at the end thereof carrying the screw 56, the screw 56 then rocking the lever 31—32 on the fulcrum 37, the cylindrical plunger 40 being forced downward, thus removing the pressure of the spring 43 from the ball 29 and permitting the ball to fall or be forced away from its seat, thus opening the valve for the admission of high pressure to the chamber 25. The effect of such an admission of high pressure is again to force the diaphragm 65 outwardly, thus allowing the spring 43 again to exert its pressure upon the plunger 40 and ball 29, thus closing the valve.

Since the diaphragm 65 has a relatively large area, a relatively low fluid pressure upon it will overcome a considerable pressure upon the external spring 78, and since the internal spring 43 may be of a strength which is far in excess of that required to maintain the ball valve closed, provided its strength is not equal to that of the spring 78, it is apparent that the same device is adapted for use in the control of pressures, both high and low, throughout a considerable range. Reducing the pressure of the external spring 78 by slightly retracting the nuts 81 will reduce the pressure in the low pressure side of the system, while increasing this spring pressure will increase the fluid pressure in the low pressure side. The adjustment of the screw 56 is required only in the beginning when the proper operative relation is made between the diaphragm and the several levers moved by it.

The invention is not limited to the specific construction illustrated and described, and reference should be had to the appended claims to determine the scope of the improvements herein set forth.

I claim:

1. In a pressure-reducing valve, the combination of an integral casing part having a main inner chamber in the form of a recess from one side of the casing part, there being an inlet port and an outlet port in communication with said chamber, a removable closure for the main chamber, a valve for opening and closing the passageway from the inlet port to said chamber, spring means arranged to operate in a direction against the pressure from said inlet port for normally maintaining said valve closed against the pressure from said inlet port, a diaphragm between said casing part and said closure, spring means for forcing the diaphragm inwardly against the low pressure normally within said chamber, and operative connections including a pair of levers providing a compound movement between said diaphragm and said valve for opening the valve a relatively great amount against its spring pressure in response to spring pressure moving the diaphragm a relatively small amount.

2. In a pressure-reducing valve, the combination of a casing forming an inner chamber, said casing having an intake passageway and an outlet passageway in communication with said chamber, a valve for closing the intake passageway, spring means arranged to operate in a direction against the pressure from the intake passageway for normally maintaining said valve in its passageway-closing position against the high pressure of the intake passageway, a diaphragm within said chamber, spring means externally of said diaphragm for forcing it inwardly, and a system of levers under the control of the diaphragm providing a compound movement for relieving the pressure of said valve-closing spring means to a relatively great extent when the low pressure in said chamber rises slightly beyond a predetermined amount.

3. In a pressure-reducing valve having an intake port and an outlet port, the combination of a valve for closing the inlet port, spring means for normally maintaining said valve closed, a lever having a fulcrum intermediate its ends and arranged to relieve the valve of such spring pressure when the lever is rocked in one direction, a second lever having a fulcrum at one end and arranged to rock said first-mentioned lever in valve-opening direction when the secondly-mentioned lever is moved in one direction, a diaphragm, means between the diaphragm and said secondly-mentioned lever for moving the secondly-mentioned lever when the diaphragm is moved in one direction, and spring means on the other side of said diaphragm from that of said valve operating means for moving the diaphragm in lever-moving direction.

4. In a pressure-reducing valve, the combination of a unitary casing part having a recess in one side forming a low pressure chamber, said casing part having an inlet port and an outlet port in communication with said chamber, the inlet port being relatively small, a diaphragm closing the open side of said chamber, a plate-like closure removably secured upon said casing part and overlying said diaphragm, packing between said plate-like closure and said casing part to form a tight joint, a spring-controlled valve within said chamber for maintaining said inlet port closed against the high pressure thereof, means within the chamber and operatively associated with the diaphragm for opening the valve when the diaphragm is moved inwardly, a leaf spring adjustably secured externally of said plate-like closure, and connecting means between the diaphragm and said last-mentioned spring.

5. In a pressure-reducing valve, the combination of a casing having a hollow interior open at one side, the casing having an inlet port and an outlet port in communication with said hollow interior, a diaphragm closing the open side of said casing, a removable cover overlying the diaphragm and secured to said casing with a tight joint, spring-controlled valve means within said hollow interior for maintaining the intake port closed against the high pressure thereof, means within said hollow interior and under the control of said diaphragm for opening said valve when the diaphragm is moved inwardly, and spring means external of the diaphragm for moving the diaphragm in said valve-opening direction against the low pressure within the chamber.

WALTER W. ROBINSON.